United States Patent
Ishida

(10) Patent No.: US 11,297,259 B2
(45) Date of Patent: Apr. 5, 2022

(54) FINDER APPARATUS, IMAGING APPARATUS, AND METHOD OF CONTROLLING FINDER APPARATUS

(71) Applicant: FUJIFILM Corporation, Tokyo (JP)

(72) Inventor: Kazuki Ishida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 127 days.

(21) Appl. No.: 16/835,964

(22) Filed: Mar. 31, 2020

(65) Prior Publication Data
US 2020/0228693 A1 Jul. 16, 2020

Related U.S. Application Data

(63) Continuation of application No. PCT/JP2018/037672, filed on Oct. 10, 2018.

(30) Foreign Application Priority Data

Oct. 31, 2017 (JP) .............................. JP2017-210222

(51) Int. Cl.
*H04N 5/238* (2006.01)
*G02F 1/163* (2006.01)
(Continued)

(52) U.S. Cl.
CPC ............. *H04N 5/238* (2013.01); *G02F 1/163* (2013.01); *G03B 11/00* (2013.01); *G03B 13/06* (2013.01);
(Continued)

(58) Field of Classification Search
CPC ............. H04N 5/238; H04N 5/232939; H04N 5/2254; H04N 5/2351; G02F 1/163; G03B 11/00; G03B 13/06
See application file for complete search history.

(56) References Cited

U.S. PATENT DOCUMENTS

| | | | |
|---|---|---|---|
| 2014/0002709 A1 | 1/2014 | Sakurabu | |
| 2014/0247386 A1 | 9/2014 | Takagi | |
| 2020/0228694 A1* | 7/2020 | Ishida | ................. G02F 1/163 |

FOREIGN PATENT DOCUMENTS

| | | |
|---|---|---|
| JP | 2003-78785 A | 3/2003 |
| JP | 2013-88597 A | 5/2013 |
| (Continued) | | |

OTHER PUBLICATIONS

International Preliminary Report on Patentability and English translation of the Written Opinion of the International Searching Authority (Forms PCT/IB/326, PCT/IB/373, and PCT/ISA/237) for International Application No. PCT/JP2018/037672, dated May 14, 2020.
(Continued)

*Primary Examiner* — James M Hannett
*Assistant Examiner* — Fayez A Bhuiyan
(74) *Attorney, Agent, or Firm* — Birch, Stewart, Kolasch & Birch, LLP

(57) ABSTRACT

A finder apparatus according to a first aspect of the present invention includes an optical finder for observing an optical image of a subject using an eyepiece portion, a display device that displays information, a half mirror that is arranged on an optical path of the optical finder, an electronically variable ND filter that is inserted on a subject side from the half mirror on the optical path of the optical finder, a brightness information acquisition unit that acquires brightness information of external light, a brightness measurement unit that measures brightness of the incident external light, and a transmittance calculation unit that calculates transmittance of the electronically variable ND filter in real time based on the measured brightness and the acquired brightness information.

19 Claims, 10 Drawing Sheets

(51) Int. Cl.
  *H04N 5/232*  (2006.01)
  *G03B 11/00*  (2021.01)
  *G03B 13/06*  (2021.01)
  *H04N 5/225*  (2006.01)
  *H04N 5/235*  (2006.01)

(52) U.S. Cl.
  CPC ......... *H04N 5/2254* (2013.01); *H04N 5/2351* (2013.01); *H04N 5/232939* (2018.08)

(56) References Cited

FOREIGN PATENT DOCUMENTS

| | | |
|---|---|---|
| JP | 2014-48491 A | 3/2014 |
| JP | 2015-233255 A | 12/2015 |
| WO | WO 2012/120952 A1 | 9/2012 |

OTHER PUBLICATIONS

International Search Report (Form PCT/ISA/210) for International Application No. PCT/JP2018/037672, dated Jan. 8, 2019, with English translation.

\* cited by examiner

FINDER APPARATUS, IMAGING APPARATUS, AND METHOD OF CONTROLLING FINDER APPARATUS

CROSS-REFERENCE TO RELATED APPLICATIONS

This application is a Continuation of PCT International Application No. PCT/JP2018/037672 filed on Oct. 10, 2018, which claims priority under 35 U.S.C § 119(a) to Japanese Patent Application No. 2017-210222 filed on Oct. 31, 2017. Each of the above application(s) is hereby expressly incorporated by reference, in its entirety, into the present application.

BACKGROUND OF THE INVENTION

1. Field of the Invention

The present invention relates to a finder apparatus, an imaging apparatus, and a method of controlling a finder apparatus and particularly, to a finder apparatus, an imaging apparatus, and a method of controlling a finder apparatus using an electronically variable neutral density filter.

2. Description of the Related Art

In an imaging apparatus, lightness may be adjusted by inserting an optical filter such as a neutral density filter (neutral density (ND)) in an imaging optical system, a finder, or the like. For example, in the disclosure of JP2014-048491A, a light scattering type liquid crystal is inserted between a pentaprism and optical path combining means and is used as light reduction means in a single-lens reflex type imaging apparatus. In addition, in the disclosure of JP2013-088597A, the transmittance of an ND filter (uses a liquid crystal) inserted in a lens barrel is controlled.

SUMMARY OF THE INVENTION

In JP2014-048491A, the transmittance of the liquid crystal is controlled by measuring the brightness of a subject using a light measurement sensor arranged outside the optical path of the light scattering type liquid crystal. Thus, the transmittance of the liquid crystal is not measured. In addition, in JP2013-088597A, the ND filter is arranged in the lens and is not used in a finder. In addition, table data of the transmittance is simply read out based on a temperature and a voltage application time. Thus, the transmittance of the ND filter is not directly measured.

Accordingly, the transmittance of the ND filter may not be measured in the technology of the related art. In such a technology, a separation between a value (in JP2014-048491A, a control target of the transmittance based on the light measurement result; in JP2013-088597A, the table data) used in control and the actual transmittance may be increased depending on characteristics (for example, a speed of change in transmittance) of the ND filter, and an image or information displayed on the finder may not be easily visually recognized.

The present invention is conceived in view of the above matter. An object of the present invention is to provide a finder apparatus, an imaging apparatus, and a method of controlling a finder apparatus capable of measuring the transmittance of a neutral density filter in real time.

In order to achieve the object, a finder apparatus according to a first aspect of the present invention comprises an optical finder for observing an optical image of a subject using an eyepiece portion, a display device that displays information, a half mirror that is arranged on an optical path of the optical finder, an electronically variable neutral density filter that is inserted on a subject side from the half mirror on the optical path of the optical finder, a brightness information acquisition unit that acquires brightness information of external light, a brightness measurement unit that measures brightness of incident light, and a transmittance calculation unit that calculates transmittance of the electronically variable neutral density filter in real time based on the measured brightness and the acquired brightness information. The external light emitted from the display device and reflected by the half mirror and the external light transmitted through the electronically variable neutral density filter and the half mirror are superimposed by the half mirror and guided to the eyepiece portion, and the external light emitted from the display device and transmitted through the half mirror and the external light transmitted through the electronically variable neutral density filter and reflected by the half mirror are superimposed by the half mirror and guided to the brightness measurement unit.

According to the finder apparatus according to the first aspect, the transmittance of the electronically variable neutral density filter (neutral density filter of which the transmittance of light can be electronically changed) may be calculated in real time from a result of measurement of the brightness by the brightness measurement unit and the brightness information of the external light. In the first aspect, the brightness information of the external light may be acquired by an imaging element comprised in an imaging apparatus in which the finder apparatus is used, or may be acquired using a separate sensor or the like. In addition, a measurement apparatus (imaging element) disposed in the finder may be used as the brightness measurement unit. In the first aspect and each of the following aspects, the "electronically variable neutral density filter" (referred to as an "electronically variable ND filter") means an ND filter that may electronically (for example, by increasing or decreasing an applied voltage) change the transmittance. In addition, the term "real time" includes calculation performed at an interval of less than or equal to a frame rate. For example, in the case of 60 frames per second, calculation may be performed once for one frame, or calculation may be performed once for a plurality of frames.

In the first embodiment, the information displayed on the display device may be an image or may be information such as imaging information (an imaging mode, a shutter speed, exposure, a remaining battery level, and the like). In addition, the finder apparatus may be incorporated in the imaging apparatus or may be an external attachment type. In the case of the external attachment type, the finder apparatus may acquire information such as the brightness information from the imaging apparatus.

A finder apparatus according to a second aspect is such that in the first aspect, the transmittance calculation unit calculates the transmittance based on the brightness measured in a period in which display of the information by the display device is stopped. According to the second aspect, the information of the display device is not superimposed with the external light incident on the brightness measurement unit. Thus, the transmittance may be accurately calculated. Stopping of the display of the information may be intermittently performed in a control cycle (like stopping once for a plurality of frames).

In a case where the display of the information is stopped, flickering of the display, a change in lightness, and the like may be sensed depending on conditions such as a stopping time and a frequency. In such a case, the stopping of the display may be set not to easily stand out by maintaining average lightness by changing brightness of the information of the display device before and after a period of stopping of the display.

A finder apparatus according to a third aspect is such that the finder apparatus in the first or second aspect further comprises a brightness control unit that maintains relative brightness between the information and the external light transmitted through the electronically variable neutral density filter and the half mirror in the eyepiece portion at a designated value by controlling display brightness of the information of the display device in real time depending on the calculated transmittance. According to the third aspect, the relative brightness is maintained by controlling the display brightness of the information of the display device in real time depending on the calculated transmittance. Thus, the information of the display device is easily visually recognized.

A finder apparatus according to a fourth aspect is such that in the third aspect, the brightness control unit performs control for maintaining the relative brightness in a case where the transmittance is changed by greater than or equal to a threshold value. In a case where the transmittance of the electronically variable neutral density filter is significantly changed (changed by greater than or equal to the threshold value), for example, in the case of significant brightness or darkness, there is a possibility that the relative brightness with the information displayed on the display device is significantly changed and the information is not easily visually recognized. Thus, the information is further easily visually recognized by performing control for maintaining the relative brightness as in the fourth aspect. In the fourth aspect, the control for maintaining the relative brightness may be performed in a case where the previously calculated transmittance is changed by greater than or equal to the threshold value, or the control for maintaining the relative brightness may be performed in a case where the magnitude of the change within a certain period is greater than or equal to the threshold value.

A finder apparatus according to a fifth aspect is such that in the third or fourth aspect, the brightness control unit performs control for maintaining the relative brightness in a case where the brightness of the external light is greater than or equal to a threshold value. In a case where the external light is bright (brightness is greater than or equal to the threshold value), the information displayed on the display device is not easily visually recognized. Thus, the information is further easily visually recognized by performing the control for maintaining the relative brightness as in the fifth aspect.

A finder apparatus according to a sixth aspect is such that in any of the first to fifth aspects, the optical finder guides the optical image of the subject based on the external light incident through a finder window to the eyepiece portion. The sixth aspect regulates a case where the optical image acquired by an optical system separate from an imaging optical system is observed using the finder apparatus.

A finder apparatus according to a seventh aspect is such that in any one of the first to fifth aspects, the optical finder guides the optical image of the subject based on the external light incident through an imaging optical system to the eyepiece portion. The seventh aspect regulates a case where an optical system of a finder is used in common as the imaging optical system as in a so-called single-lens reflex type imaging apparatus.

A finder apparatus according to an eighth aspect is such that in any one of the first to seventh aspects, the electronically variable neutral density filter is a neutral density filter using an electrochromic element. The electrochromic element is an element that uses an oxidation-reduction reaction, and it takes time to reach target transmittance in a case where the external light is dimmed. Thus, each aspect of the present invention in which the transmittance is calculated in real time is effective.

In order to achieve the above object, an imaging apparatus according to a ninth aspect of the present invention is an imaging apparatus comprising the finder apparatus according to any one of the first to eighth aspects, an imaging element that outputs a signal indicating the optical image of the subject, and a transmittance control unit that controls the transmittance of the electronically variable neutral density filter. The brightness information acquisition unit acquires the brightness information of the external light based on the signal output by the imaging element, and the transmittance control unit controls the transmittance of the electronically variable neutral density filter based on the acquired brightness information of the external light. According to the ninth aspect, the transmittance is controlled based on the brightness information of the external light. Thus, the image or the information displayed on the finder is further easily visually recognized.

An imaging apparatus according to a tenth aspect is such that in the ninth aspect, the electronically variable neutral density filter includes a plurality of regions, and the transmittance control unit independently controls the transmittance for the plurality of regions. In a case where the electronically variable neutral density filter is divided into a plurality of regions, appropriate transmittance may vary for each region. In such a case, appropriate transmittance for each region may be implemented by independently controlling the transmittance of the plurality of regions as in the tenth aspect. The regions of the electronically variable neutral density filter may be set in correspondence with regions (an image display region, an imaging information display region, and the like) of the display device.

In order to achieve the above object, a method of controlling a finder apparatus according to an eleventh aspect of the present invention is a method of controlling a finder apparatus. The finder apparatus includes an optical finder for observing an optical image of a subject using an eyepiece portion, a display device that displays information, a half mirror that is arranged on an optical path of the optical finder, an electronically variable neutral density filter that is inserted on a subject side from the half mirror on the optical path of the optical finder, a brightness information acquisition unit that acquires brightness information of external light, and a brightness measurement unit that measures brightness of incident light, in which light emitted from the display device and reflected by the half mirror and the external light transmitted through the electronically variable neutral density filter and the half mirror are superimposed by the half mirror and guided to the eyepiece portion, and the external light emitted from the display device and transmitted through the half mirror and the external light transmitted through the electronically variable neutral density filter and reflected by the half mirror are superimposed by the half mirror and guided to the brightness measurement unit. The method comprises a brightness measurement step of measuring the brightness of the external light guided to the brightness measurement unit by the brightness measurement unit, and a transmittance calculation step of calculating transmittance of the electronically variable neutral density filter in real time based on the measured brightness and the acquired brightness information. According to the eleventh aspect, the transmittance of the electronically variable neutral density filter (neutral density filter of which the transmittance may be electronically changed) may be calculated in real time in the same manner as the first aspect.

A method of controlling a finder apparatus according to a twelfth aspect is such that the method in the eleventh aspect further comprises a relative brightness control step of maintaining relative brightness between the information and the external light transmitted through the electronically variable neutral density filter and the half mirror at a designated value by controlling display brightness of the information of the display device in real time depending on the calculated transmittance. According to the twelfth aspect, the relative brightness is maintained in the same manner as the third aspect. Thus, the image or the information displayed on the display device is easily visually recognized (observed).

A method of controlling a finder apparatus according to a thirteenth aspect is such that the method in the eleventh or twelfth aspect further comprises a brightness information acquisition step of acquiring the brightness information of the external light based on a signal that is output from an imaging element and indicates the optical image of the subject, and a transmittance control step of controlling the transmittance of the electronically variable neutral density filter based on the acquired brightness information. According to the thirteenth aspect, the image or the information displayed on the finder is easily visually recognized (observed) in the same manner as the ninth aspect.

A program causing a finder apparatus and/or an imaging apparatus to execute the method of controlling the finder apparatus according to the eleventh to thirteenth aspects, and a non-transitory recording medium on which a computer-readable code of the program is recorded may also be exemplified as aspects of the present invention.

As described above, according to the finder apparatus, the imaging apparatus, and the method of controlling the finder apparatus of the present invention, the transmittance of the neutral density filter may be measured in real time.

DESCRIPTION OF THE PREFERRED EMBODIMENTS

Hereinafter, a finder apparatus, an imaging apparatus, and a method of controlling a finder apparatus according to an embodiment of the present invention will be described in detail with reference to the appended drawings.

First Embodiment

<Overall Configuration of Imaging Apparatus>

Figure 1:
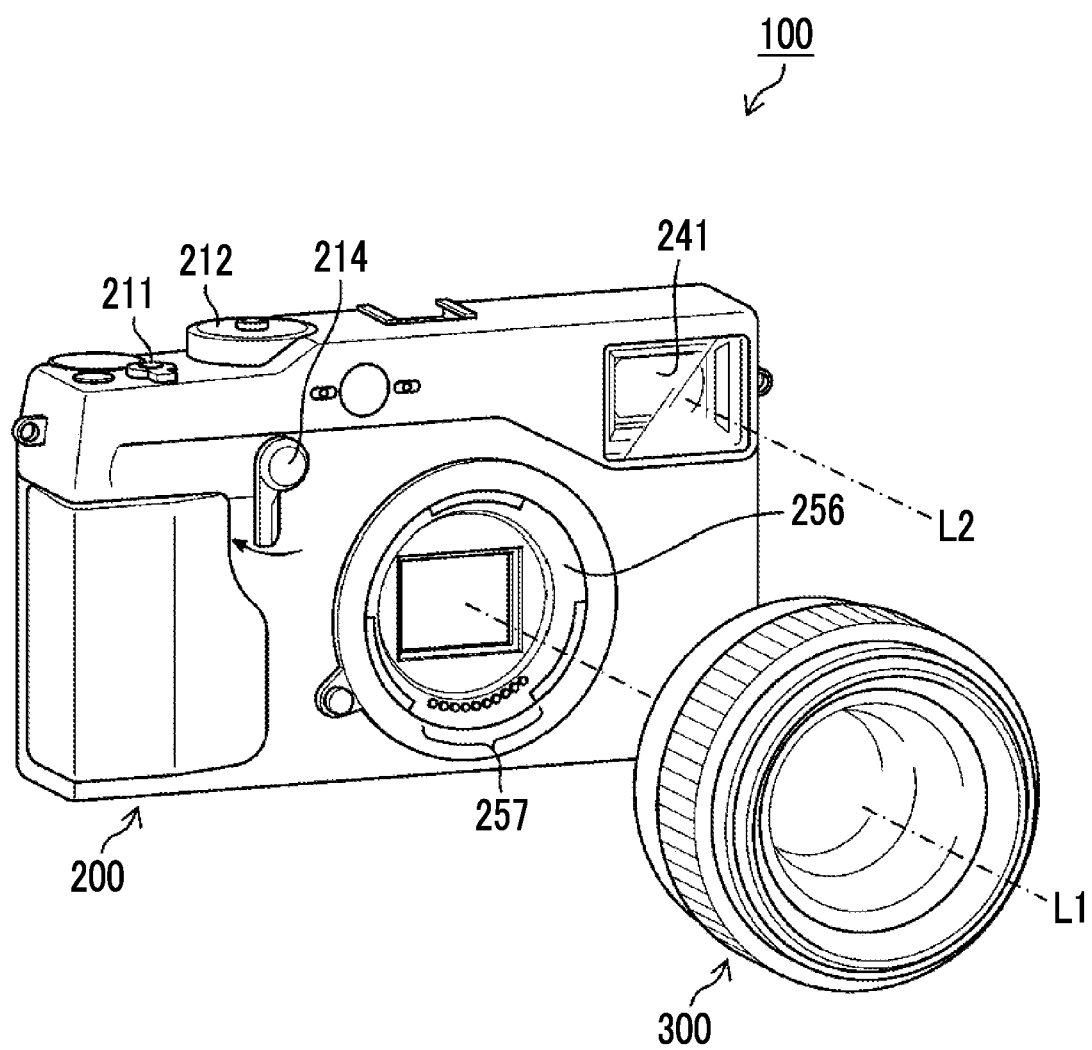
FIG. 1 is a perspective front view of an imaging apparatus according to a first embodiment.
Figure 2:
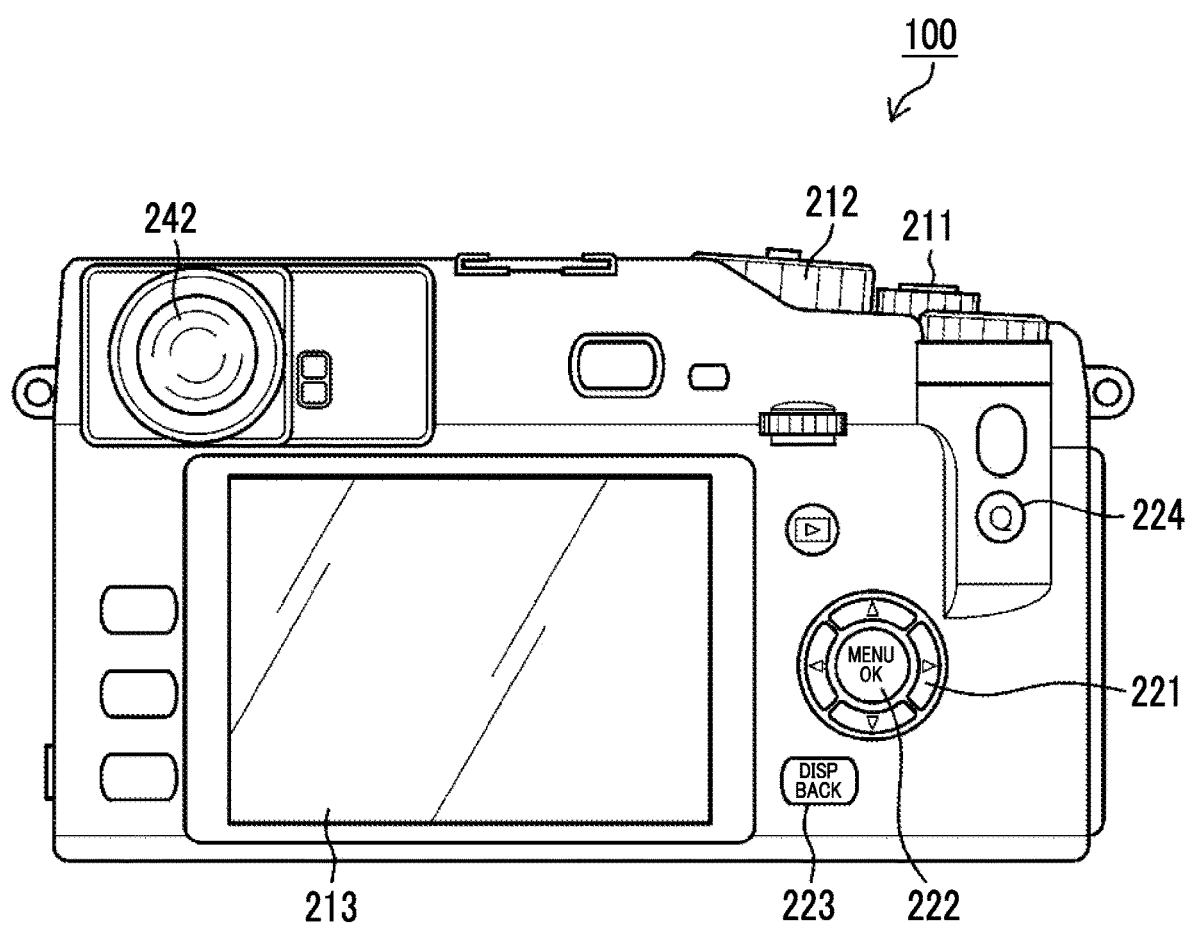
FIG. 2 is a rear view of the imaging apparatus according to the first embodiment.

FIG. 1 is a perspective front view of an imaging apparatus 100 according to a first embodiment of the present invention, and FIG. 2 is a rear view of the imaging apparatus 100. The imaging apparatus 100 is configured with a camera main body 200 and an interchangeable lens 300 mounted on the camera main body 200. The camera main body 200 and the interchangeable lens 300 are mounted by coupling between a mount 256 (refer to FIG. 3) (camera mount) comprised in the camera main body 200 and a mount 346 (refer to FIG. 3) corresponding to the mount 256 on the interchangeable lens 300 side. By releasing the coupling between the mount 256 and the mount 346, the interchangeable lens 300 may be detached from the camera main body 200. A terminal 257 is disposed in the mount 256, and a terminal 347 is disposed in the mount 346 (refer to FIGS. 1 and 3). In a case where the interchangeable lens 300 is coupled to the camera main body 200, the terminal 257 and the terminal 347 come into contact and are set to a communicable state.

In addition to the mount 256 and the terminal 257, a finder window 241 (finder window) of a finder 240 (described later), a switching lever 214, and the like are disposed on the front surface of the camera main body 200. An optical axis L2 of the finder 240 is an optical axis that is different from an optical axis L1 of the interchangeable lens 300. In addition, a release button 211 and a dial 212 for imaging mode setting are mainly disposed on the upper surface of the camera main body 200.

A finder eyepiece portion 242 of the finder 240, a monitor 213, a MENU/OK key 222, a cross key 221 (direction instruction button), a BACK key 223, and a Q button 224 are mainly disposed on the rear surface of the camera main body 200.

The MENU/OK key 222 is an operation key that has both a function as a menu button for providing an instruction to display menus on a screen of the monitor 213 and a function as an OK button for providing an instruction for confirmation, execution, and the like of a selected content. The cross key 221 is an operation unit that inputs instructions in four directions of upper, lower, leftward, and rightward directions and functions as a button (cursor movement operation means) for selecting an item from a menu screen or providing an instruction to select various setting items from each menu. Upper and lower keys of the cross key 221 functions as a zoom switch at the time of imaging or a playback zoom switch at the time of a playback mode, and left and right keys function as a frame advancing (advancing in a forward direction or a reverse direction) button at the time of the playback mode. The BACK key 223 is used at the time of deleting a desired target such as the selected item, canceling an instruction content, or returning to a previous operation state. The Q button 224 functions as a button for providing an instruction to display the menu screen on the screen of the monitor 213.

Figure 3:
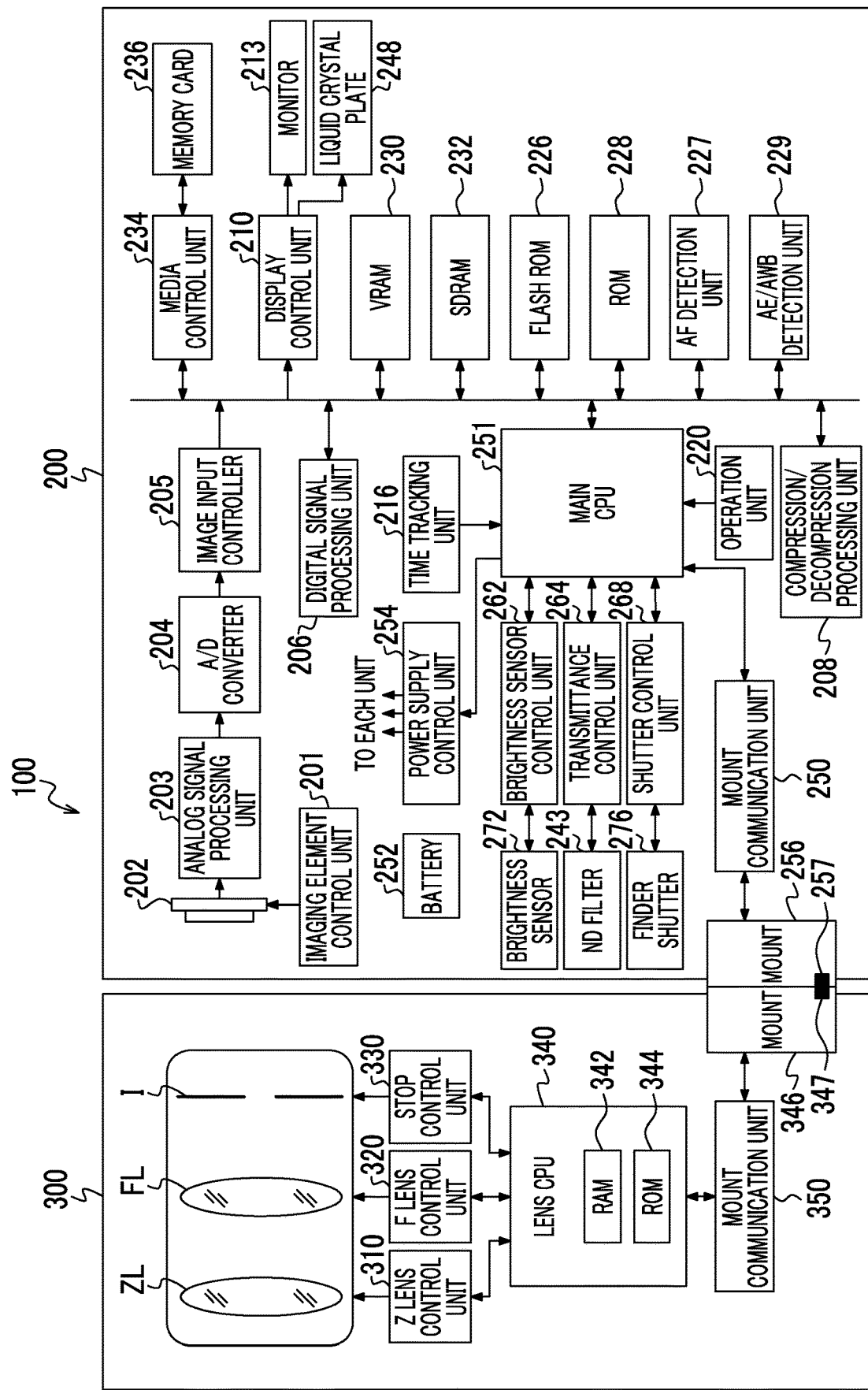
FIG. 3 is a block diagram illustrating a configuration of the imaging apparatus according to the first embodiment.

FIG. 3 is a block diagram illustrating a configuration of the imaging apparatus 100. The operation of the imaging apparatus 100 is subjected to integrated control by a main central processing unit (CPU) 251 of the camera main body 200 and a lens CPU 340 of the interchangeable lens 300.

The main CPU 251 loads a camera control program stored in a flash read only memory (ROM) 226 into a synchronous dynamic random access memory (SDRAM) 232 and executes various types of processing using the SDRAM 232 as a work memory. The lens CPU 340 loads a camera control program stored in a ROM 344 into a random access memory (RAM) 342 and executes various types of processing using the RAM 342 as a work memory. The SDRAM 232 is used as a calculation work region of the main CPU 251 and is also used as a temporary storage region of image data. The flash ROM 226 (non-transitory recording medium) stores a computer-readable code of the control program (including a program for executing the method of controlling the finder apparatus according to the embodiment of the present invention) executed by the main CPU 251 and various data and the like necessary for control. The ROM 228 stores various information related to the operation of a digital camera like user setting information.

In a case where an operation unit 220 that includes the MENU/OK key 222, the cross key 221, the BACK key 223, and the like is operated by a user, a signal from the operation unit 220 is input into the main CPU 251. The main CPU 251 controls each circuit of the camera main body 200 based on the input signal and transmits and receives signals to and from the mount 346 and a mount communication unit 350 of the interchangeable lens 300 through the mount 256 and a mount communication unit 250.

The terminal 257 is disposed in the mount 256, and the terminal 347 is disposed in the mount 346. In a case where the interchangeable lens 300 is mounted on the camera main body 200, the corresponding terminal 257 and the terminal 347 come into contact and may communicate. The terminal 257 and the terminal 347 in FIG. 1 and FIG. 2 are conceptual illustrations, and the position and the number of terminals in the imaging apparatus 100 are not limited to the illustrations. A drive instruction, various control statuses (a lens drive start/completion notification and the like), setting information of the lens, and the like are communicated between the camera main body 200 and the interchangeable lens 300. For example, the above terminal includes a ground terminal, a synchronization signal terminal, a serial communication terminal, a control status communication terminal, and a terminal for power supply from a battery 252 of the camera main body 200 to each unit of the interchangeable lens 300.

The interchangeable lens 300 is mainly configured with a zoom lens ZL, a focus lens FL, a stop I, the lens CPU 340, and the like.

The zoom lens ZL and the focus lens FL perform zooming and focusing by moving forward and rearward on the same optical axis. The focal length of the zoom lens ZL is changed by driving the zoom lens ZL by a zoom lens control unit 310. The main CPU 251 changes the focal length by moving the zoom lens ZL in the interchangeable lens 300 in accordance with a zoom operation (rotational movement or the like of a zoom ring) performed by the user. The focus lens FL is driven by a focus lens control unit 320.

The stop I controls the quantity of light incident on an imaging element 202 and controls a shutter speed and exposure. For example, the stop I includes five stop leaf blades and is subjected to stop control by 1 AV in six stages from an F number F1.4 to F11. The opening amount of the stop I is adjusted by driving the stop I by a stop control unit 330.

The lens CPU 340 decides the movement amounts of the zoom lens ZL and the focus lens FL based on the current positions and lens target positions of the zoom lens ZL and the focus lens FL detected by a position sensor (not illustrated) in the optical axis direction and the setting information of the interchangeable lens 300 loaded in the RAM 342 from the ROM 344.

The zoom lens control unit 310 changes an imaging magnification by moving the zoom lens ZL in the optical axis direction in accordance with an instruction from the lens CPU 340. The focus lens control unit 320 performs focusing on a subject by moving the focus lens FL forward and rearward in the optical axis direction in accordance with an instruction from the lens CPU 340. The stop control unit 330 changes the F number of the stop I in accordance with an instruction from the lens CPU 340.

The imaging element 202 (brightness information acquisition unit) is arranged in a rear stage of the zoom lens ZL, the focus lens FL, and the stop I and receives subject light that is transmitted through the zoom lens ZL, the focus lens FL, and the stop I. The imaging element 202 comprises a light-receiving surface on which multiple light-receiving elements are arranged in a matrix form. An image of the subject light transmitted through the zoom lens ZL, the focus lens FL, and the stop I is formed on the light-receiving surface of the imaging element 202, and the subject light is converted into an electrical signal by each light-receiving element. Various photoelectric conversion elements such as a complementary metal-oxide semiconductor (CMOS) and a charge-coupled device (CCD) may be used as the imaging element 202.

The imaging element 202 outputs electric charges accumulated in each pixel as a serial image signal one line at a time in synchronization with a vertical transfer clock and a horizontal transfer clock supplied from an imaging element control unit 201. The main CPU 251 controls driving of the imaging element 202 by controlling the imaging element control unit 201.

An electric charge accumulation time (exposure time) of each pixel is decided by an electronic shutter drive signal provided from the imaging element control unit 201. The main CPU 251 provides an instruction for the electric charge accumulation time to the imaging element control unit 201.

The output of the image signal is started in a case where the imaging apparatus 100 is set to an imaging mode. That is, in a case where the imaging apparatus 100 is set to the imaging mode, the output of the image signal is started in order to display a live view image on the monitor 213. The output of the image signal for the live view image is temporarily stopped in a case where an instruction for main imaging is provided, and is started again in a case where the main imaging is finished.

The image signal output from the imaging element 202 is an analog signal. This analog image signal is acquired into an analog signal processing unit 203.

The analog signal processing unit 203 is configured to include a correlated double sampling (CDS) circuit and an automatic gain control (AGC) circuit. The CDS removes noise included in the image signal, and the AGC amplifies the image signal from which the noise is removed. The analog image signal subjected to signal processing by the analog signal processing unit 203 is acquired into an A/D converter 204.

The A/D converter 204 converts the incorporated analog image signal into a digital image signal having a range of gradations. This image signal is so-called RAW data and has a gradation value indicating the density of R, G, and B for each pixel.

An image input controller 205 incorporates a line buffer and accumulates the image signal of one frame output from the A/D converter 204. The image signal of one frame accumulated in the image input controller 205 is stored in the SDRAM 232.

The image signal of one frame stored in the SDRAM 232 is acquired into a digital signal processing unit 206 in a point-sequential manner (in order of pixels).

The digital signal processing unit 206 generates an image signal (Y/C signal) including a brightness signal Y and color difference signals Cr and Cb by performing signal processing on the image signal of each color of R, G, and B acquired in a point-sequential manner.

An AF detection unit 227 acquires the image signals of R, G, and B stored in the SDRAM 232 and calculates a focus evaluation value necessary for automatic focus (AF) control in accordance with an instruction from the main CPU 251. The AF detection unit 227 includes a high-pass filter that passes only high-frequency components of a G signal, an absolute value processing unit, an AF area extraction unit that cuts out a signal in a focus region (hereinafter, referred to as an AF area) set on the screen, and an integrating accumulation unit that performs integrating accumulation on absolute value data in the AF area. The AF detection unit 227 outputs the absolute value data subjected to the integrating accumulation by the integrating accumulation unit in the AF area to the main CPU 251 as the focus evaluation value. As a method of controlling the focus lens FL based on the focus evaluation value, a method of searching for a position at which the focus evaluation value is maximum, and moving the focus lens FL to the position may be used. A hill climbing method of moving the focus lens FL in a direction in which the focus evaluation value increases, and setting a focus lens group to a position in a case where a point at which the focus evaluation value starts to decrease is detected may also be used. A phase difference method of separately arranging an imaging element for phase difference AF using a phase difference and performing AF using the phase difference detected by the imaging element for phase difference AF may also be used.

An AE/AWB detection unit 229 (brightness information acquisition unit) acquires the image signals of R, G, and B stored in the SDRAM 232, performs integrating accumulation on the G signal of the entire screen, performs integrating accumulation on the G signal for which different weights are applied between a center portion and a periphery portion of the screen, and outputs an integrating accumulation value necessary for AE control to the main CPU 251. The main CPU 251 calculates the brightness value (brightness information) of external light from the integrating accumulation value and obtains an exposure value from the brightness value. In addition, the F number and the shutter speed are decided from the exposure value in accordance with a program line diagram. The calculated brightness value is also used in control of the finder (described later).

In addition, the AE/AWB detection unit 229 divides one screen into a plurality of areas (for example, 16×16) and calculates an average integrating accumulation value of each color of the image signals of R, G, and B for each divided area as a physical quantity necessary for AWB control. The main CPU 251 obtains the ratios of R/G and B/G for each divided area from the obtained integrating accumulation value of R, the integrating accumulation value of B, and the integrating accumulation value of G and performs a light source type determination based on a distribution and the like of the obtained values of R/G and B/G in color spaces of R/G and B/G. After the determination, for example, gain values (white balance correction values) for R, G, and B signals of a white balance adjustment circuit are decided in accordance with a white balance adjustment value suitable for the light source type such that the value of each ratio becomes equal to approximately 1 (that is, the integrating accumulation ratio of RGB in one screen is R:G:B=1:1:1). The AE/AWB detection unit 229 performs white balance adjustment by applying the digital gains corresponding to the light source type to the image signal of one frame stored in the SDRAM 232 and generates the R, G, and B signals by performing gamma (gradation characteristics) processing and sharpness processing.

A compression/decompression processing unit 208 generates compressed image data by performing compression processing on image data generated by the digital signal processing unit 206 in accordance with an instruction from the main CPU 251. In addition, non-compressed image data is generated by performing decompression processing on the compressed image data. A media control unit 234 records image data obtained by imaging on the memory card 236 and reads out a recorded image from the memory card 236 in accordance with an instruction from the main CPU 251.

A time tracking unit 216 as a timer tracks time based on an instruction from the main CPU 251. In addition, the time tracking unit 216 as a calendar tracks the current year, month, date, and time. A power supply control unit 254 applies a power supply voltage supplied from the battery 252 to each unit of the camera main body 200 in accordance with an instruction from the main CPU 251.

A display control unit 210 (brightness control unit) controls a display on the monitor 213 and a liquid crystal plate 248 (including brightness control of information displayed on the liquid crystal plate 248). A brightness sensor control unit 262 (brightness measurement unit) controls brightness measurement of an incidence ray performed by a brightness sensor 272 (brightness measurement unit). A transmittance control unit 264 (a transmittance calculation unit and a transmittance control unit) calculates the transmittance of an ND filter 243 in real time and independently controls the transmittance of the ND filter 243 for each region (described later). A shutter control unit 268 controls insertion and retraction states of a finder shutter 276. Each of these units operates in accordance with an instruction from the main CPU 251.

The function of each of the above units (the display control unit 210, the AE/AWB detection unit 229, the brightness sensor control unit 262, the transmittance control unit 264, and the shutter control unit 268) may be implemented using various processors. For example, the various processors include a CPU that is a general-purpose processor implementing various functions by executing software (program). In addition, the various processors include a programmable logic device (PLD) such as a field programmable gate array (FGPA) that is a processor having a circuit configuration changeable after manufacturing. Furthermore, the various processors include a dedicated electric circuit or the like such as an application specific integrated circuit (ASIC) that is a processor having a circuit configuration dedicatedly designed to execute specific processing.

The function of each unit may be implemented by one processor or may be implemented by combining a plurality of processors. In addition, a plurality of functions may be implemented by one processor. As an example of configuring a plurality of functions with one processor, first, as represented by computers such as a client and a server, one processor is configured with a combination of one or more CPUs and software, and this processor implements the plurality of functions. Second, as represented by a system on chip (SoC) and the like, a processor that implements the function of the entire system using one integrated circuit (IC) chip is used. Accordingly, various functions are configured using one or more of the various processors as a hardware structure. Furthermore, the hardware structure of the various processors is more specifically an electric circuit (circuitry) in which circuit elements such as semiconductor elements are combined.

In a case where the processor or the electric circuit executes software (program), a processor (computer)-readable code of the executed software is stored in a non-transitory recording medium such as the ROM 228 and/or the flash ROM 226 (refer to FIG. 3), and the processor refers to the software. The software stored in the non-transitory recording medium includes a program for executing the method of controlling the finder apparatus according to the embodiment of the present invention. Instead of the ROM 228, the code may be recorded on a non-transitory recording medium such as various magneto-optical recording apparatuses and semiconductor memories. In the case of processing using the software, for example, a VRAM 230 and the SDRAM 232 are used as a temporary storage region. In addition, for example, data stored in an electronically erasable and programmable read only memory (EEPROM), not illustrated, may also be referred to.

<Configuration of Finder Apparatus>

Figure 4:
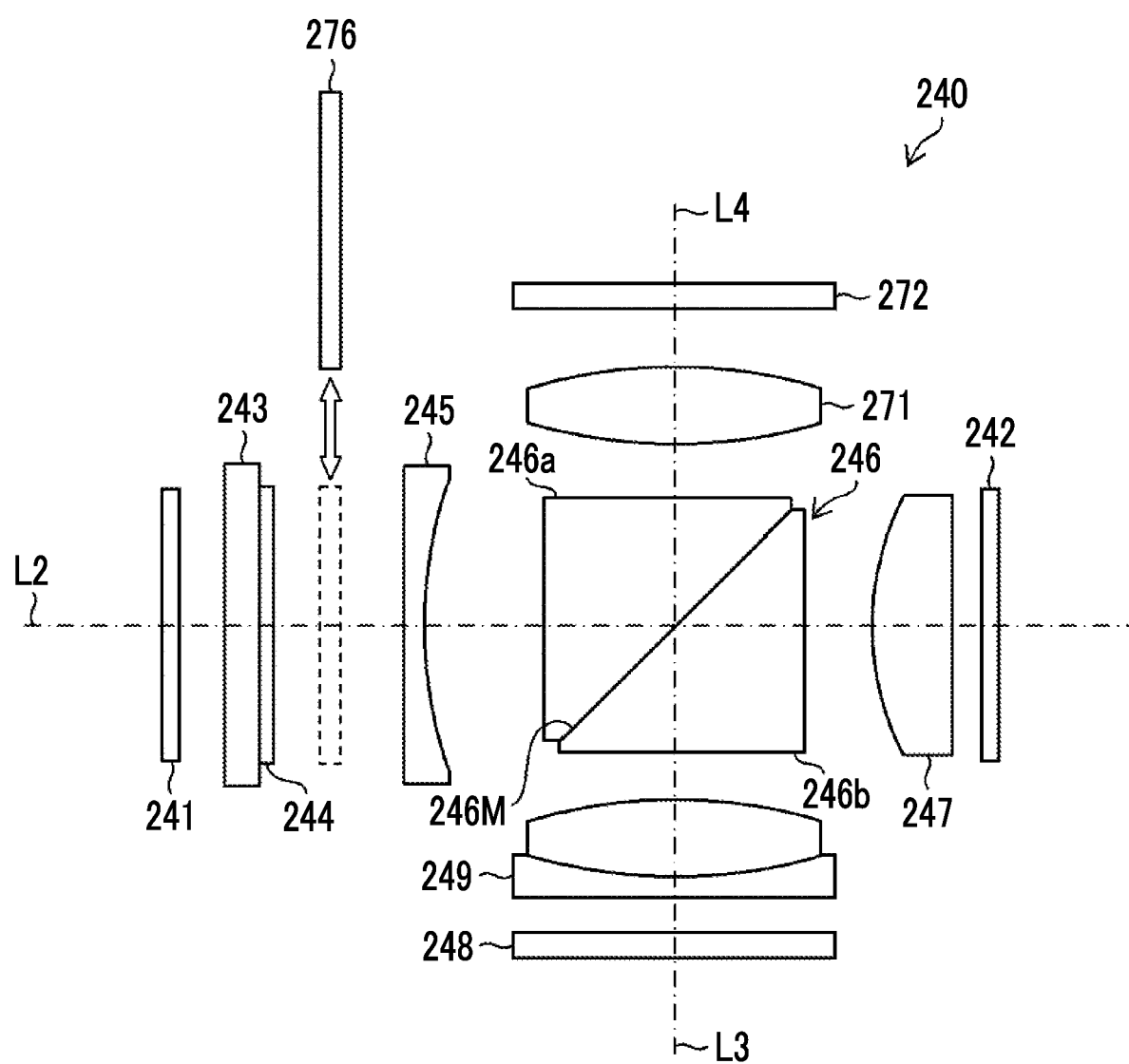
FIG. 4 is a schematic diagram illustrating a configuration of an optical system of a finder.

FIG. 4 is a schematic diagram illustrating an optical system of the finder 240 (the finder apparatus and an optical finder). The finder 240 comprises the finder window 241, the finder eyepiece portion 242, the ND filter 243, a ¼ wave plate 244 (quarter-wave plate), the finder shutter 276, an objective lens 245, a prism 246 (a optical member and a half mirror), an eyepiece lens 247, the liquid crystal plate 248, a liquid crystal plate lens 249, a brightness sensor lens 271, and the brightness sensor 272. In addition to these members of the optical system, constituents of the finder 240 in the first embodiment also include the AE/AWB detection unit 229, the brightness sensor control unit 262, the transmittance control unit 264, the shutter control unit 268, and the display control unit 210.

The finder window 241, the finder eyepiece portion 242, the ND filter 243, the ¼ wave plate 244, the objective lens 245, the prism 246, and the eyepiece lens 247 are arranged on the optical axis L2. The subject light transmitted through the finder window 241, the ND filter 243, the objective lens 245, and the prism 246 is guided to the finder eyepiece portion 242 by the eyepiece lens 247. Consequently, an optical image of the subject can be observed using the finder eyepiece portion 242. That is, the finder window 241, the ND filter 243, the ¼ wave plate 244, the objective lens 245, the prism 246, the eyepiece lens 247, and the finder eyepiece portion 242 function as the optical finder (optical view finder).

The neutral density filter 243 (electronically variable ND filter; neutral density (ND)) is disposed on the rear surface (on the subject side from the prism 246) of the finder window 241 in a state where the ND filter 243 is perpendicular to the optical axis L2 of the subject light incident from the finder window 241. The ND filter 243 is an ND filter using an electrochromic (EC) element (EC element) and is an electronically variable ND filter of which the light transmittance can be changed by applying a voltage. The ¼ wave plate 244 is disposed on the rear surface (finder eyepiece portion 242 side) of the ND filter 243. In a case where light incident on the optical finder is polarized, a view varies depending on whether the imaging apparatus 100 is in a vertical position or a horizontal position. Thus, the ¼ wave plate 244 is used for converting the light into circular polarized light.

The finder shutter 276 is disposed on the finder eyepiece portion 242 side of the ND filter 243. The finder shutter 276 is inserted on the optical path of the subject light (or retracted from the optical path) by the rotational movement operation of the switching lever 214 (refer to FIG. 1). The finder 240 operates as an electronic view finder (EVF) in a state where the finder shutter 276 is inserted on the optical path, and operates as an optical view finder (OVF) in a state where the finder shutter 276 is retracted from the optical path.

Figure 8:
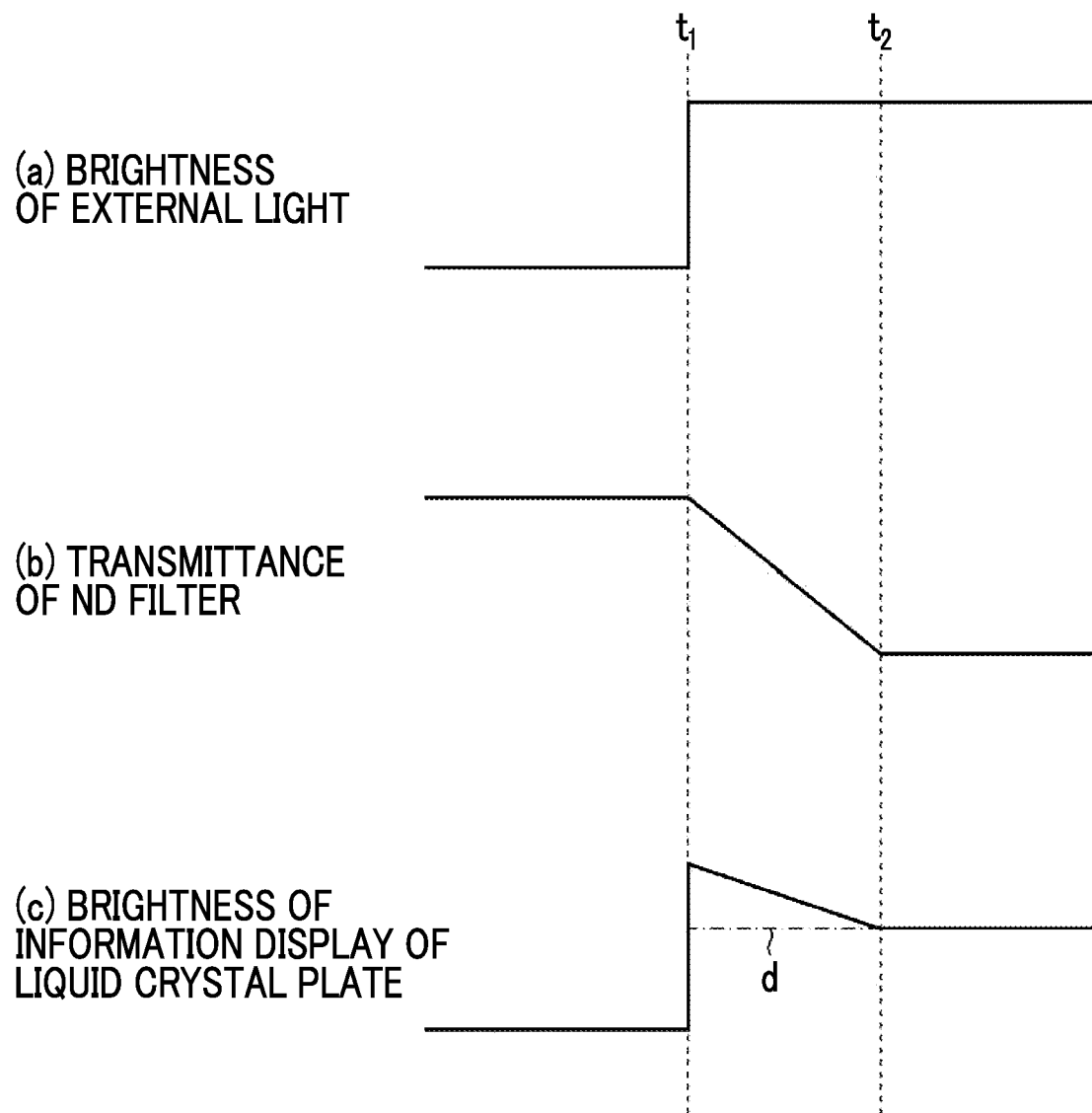
FIG. 8 is a diagram illustrating a relationship among brightness of external light, the transmittance of the ND filter, and display brightness of information by a display apparatus.
Figure 9:
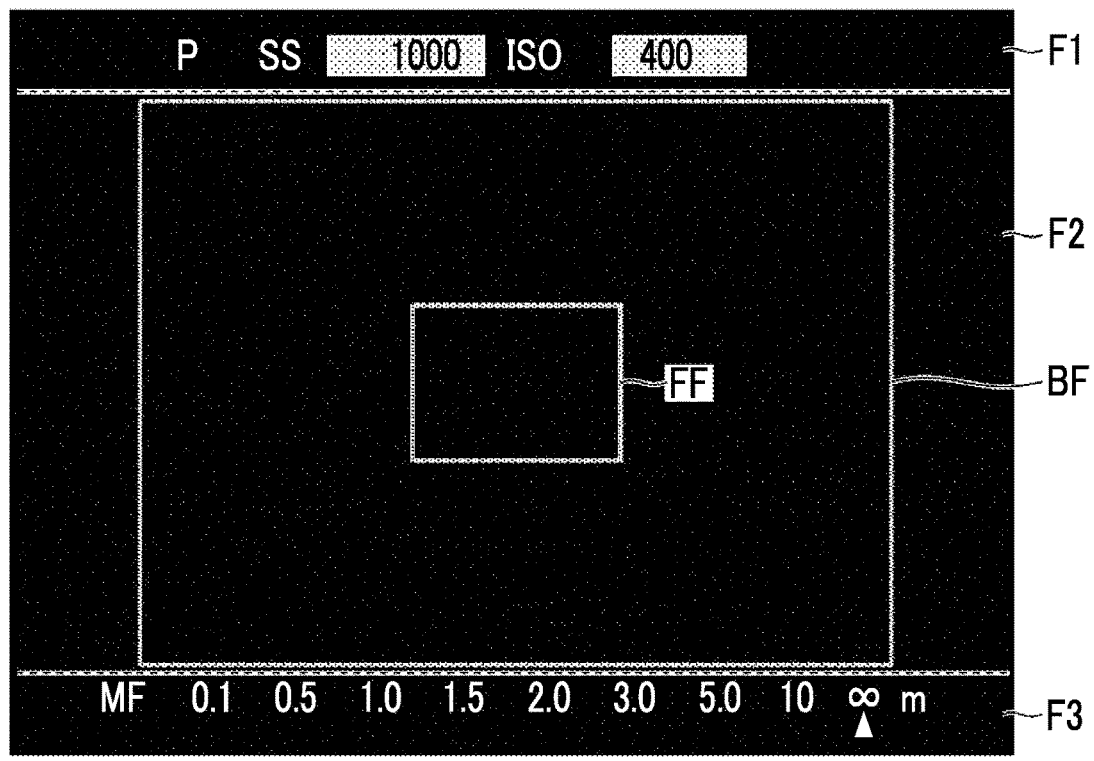
FIG. 9 is a diagram illustrating a state of display of the finder.
Figure 10:
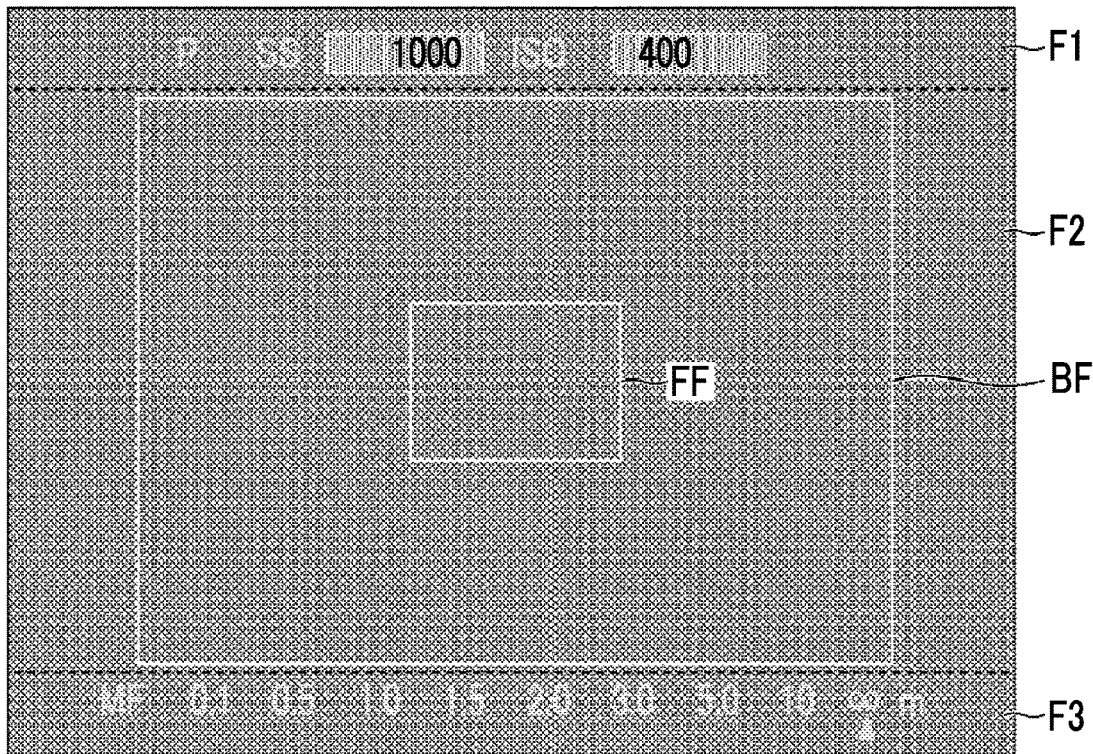
FIG. 10 is another diagram illustrating the state of display of the finder.

Information such as imaging information and a frame showing an imaging range that is the range of the subject light incident on the light-receiving surface of the imaging element 202 is displayed on the liquid crystal plate 248 (liquid crystal panel) based on the focal length (angle of view) of the interchangeable lens 300 under control of the display control unit 210 (refer to FIGS. 8 to 10 and the like). In addition, an inverted image (or a part thereof) of the subject image may be displayed on the liquid crystal plate 248 under control of the display control unit 210. Light (based on backlight of the liquid crystal plate 248) that shows an image and/or information displayed on the liquid crystal plate 248 is transmitted through the liquid crystal plate lens 249 disposed on an optical axis L3 and is incident on the prism 246. Hereinafter, the image, the frame, the imaging information, and the like displayed on the liquid crystal plate 248 will be collectively referred to as "information".

The prism 246 is configured with a first prism 246a and a second prism 246b. A half mirror surface 246M (half mirror) is formed in a part where the first prism 246a and the second prism 246b are joined. The half mirror surface 246M is arranged at an inclination of 45° with respect to the optical axis L3 of the liquid crystal plate lens 249. The information displayed on the liquid crystal plate 248 is enlarged by the liquid crystal plate lens 249, is subjected to left-right inversion by the half mirror surface 246M, and is reflected in the rightward direction (direction of the finder eyepiece portion 242) in FIG. 4. The information reflected by the half mirror surface 246M is superimposed by the prism 246 with light (subject light) that is transmitted through the ND filter 243 and transmitted through the half mirror surface 246M, and the information is transmitted through the eyepiece lens 247 and guided to the finder eyepiece portion 242 (eyepiece portion). The subject light reflected by the half mirror surface 246M and the light (based on the backlight of the liquid crystal plate 248) showing the information which is displayed on the liquid crystal plate 248 and transmitted through the half mirror surface 246M are superimposed by the prism 246, and the subject light is transmitted through the brightness sensor lens 271 and guided to the brightness sensor 272 (brightness measurement unit) as light on an optical axis L4. Various sensors such as a CCD type and a CMOS type can be used as the brightness sensor 272 in the same manner as the imaging element 202.

<Regions of ND Filter>

Figure 5:
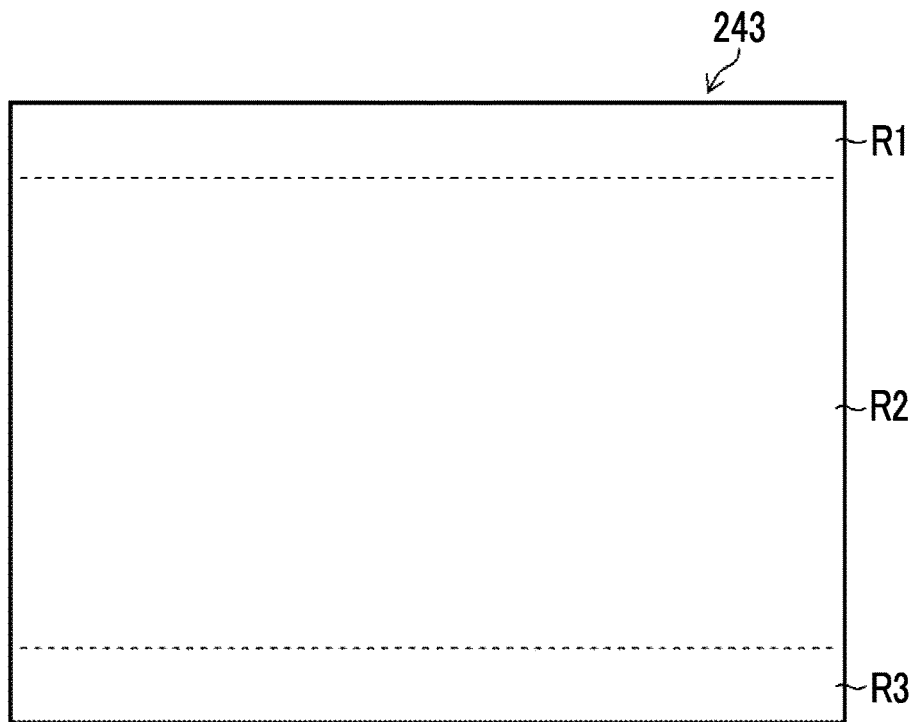
FIG. 5 is a diagram illustrating regions of an ND filter.

As illustrated in FIG. 5, the ND filter 243 includes regions R1, R2, and R3, and calculation and control of the transmittance are independently performed for each region. The regions R1 and R3 correspond to a region in which the information such as the imaging information is mainly displayed in the display range of the optical finder (refer to FIGS. 8 to 10), and the region R2 corresponds to a region in which the image (the optical image of the subject) is mainly displayed (refer to FIGS. 8 to 10). In the ND filter 243, transparent electrodes corresponding to the regions R1, R2, and R3 are arranged. The transmittance of each region may be independently controlled by causing the transmittance control unit 264 to set an applied voltage for each region. A transmittance changing region is not created by overlaying optical filters. Thus, control of the transmittance may be implemented using a space of one EC element. In addition, the transmittance of each region may be independently controlled. Thus, for example, external light in only the region in which the information is displayed may be selectively attenuated, and the information displayed on the liquid crystal plate 248 may be visually recognized with the minimum necessary attenuation of the external light. Furthermore, by setting the shape, size, arrangement, and the like of the transparent electrodes, a region in which the transmittance is not changed may be set, or the transmittance may be continuously changed. Thus, the user may easily perceptively recognize the external light before and after a change in transmittance and may be assisted in reflecting the effect of the change in transmittance on exposure setting. Measurement of brightness of external light (acquisition of the brightness information) based on an output signal of the imaging element 202 and display control (including control for maintaining relative brightness) of the liquid crystal plate 248 are performed for each region (regions F1 to F3; refer to FIGS. 8 to 10) corresponding to the regions R1, R2, and R3.

Figure 6:
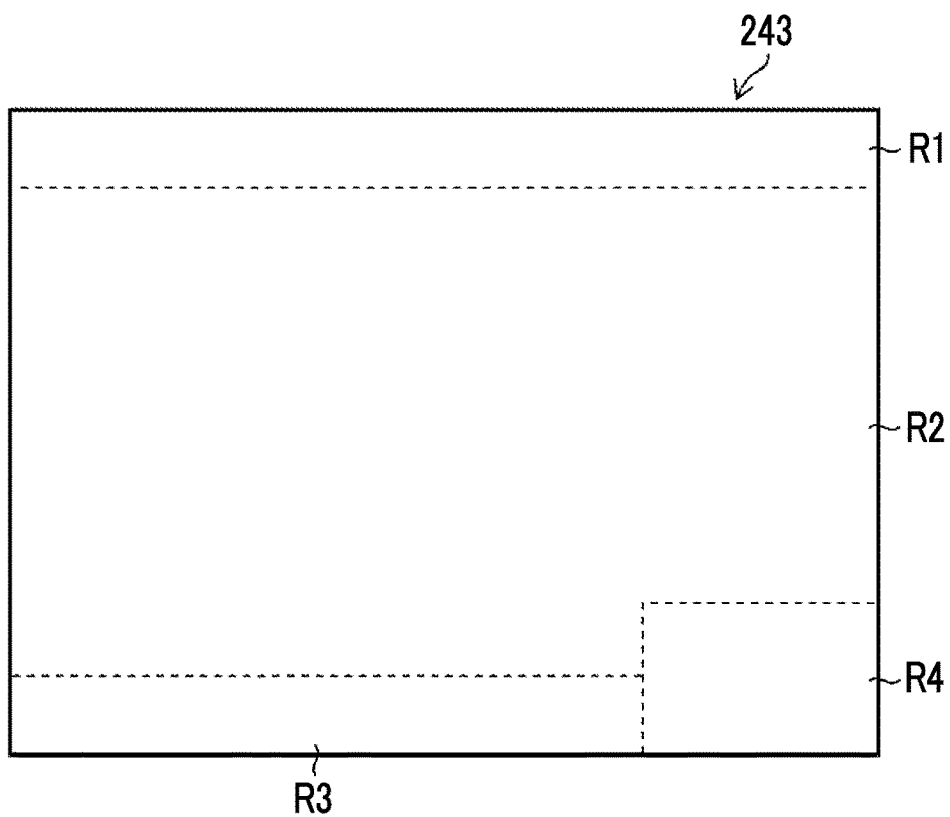
FIG. 6 is another diagram illustrating the regions of the ND filter.

The regions and the transparent electrodes of the ND filter 243 are not limited to the arrangement in FIG. 5 and may be divided into a different number and sizes from FIG. 5 such that the region for displaying the information is disposed in upper, lower, left, and right portions in FIG. 5. In addition, for example, as illustrated in FIG. 6, a region R4 (and a corresponding transparent electrode) may be disposed in the ND filter 243. The region R4 is a region corresponding to a region (so-called "small window") that is disposed in the liquid crystal plate 248 and displays an enlarged part (a region in which a main subject is present, a part of the AF area, or the like) of the subject image. The transmittance may be stepwise and continuously changed between a region (periphery part) on the outside of the ND filter 243 and a region (center part) on the inside of the ND filter 243. In this case, the brightness of the information display on the outside may be preferentially increased by decreasing the transmittance on the outside below the transmittance on the inside.

<Method of Controlling Finder Apparatus>

Figure 7:
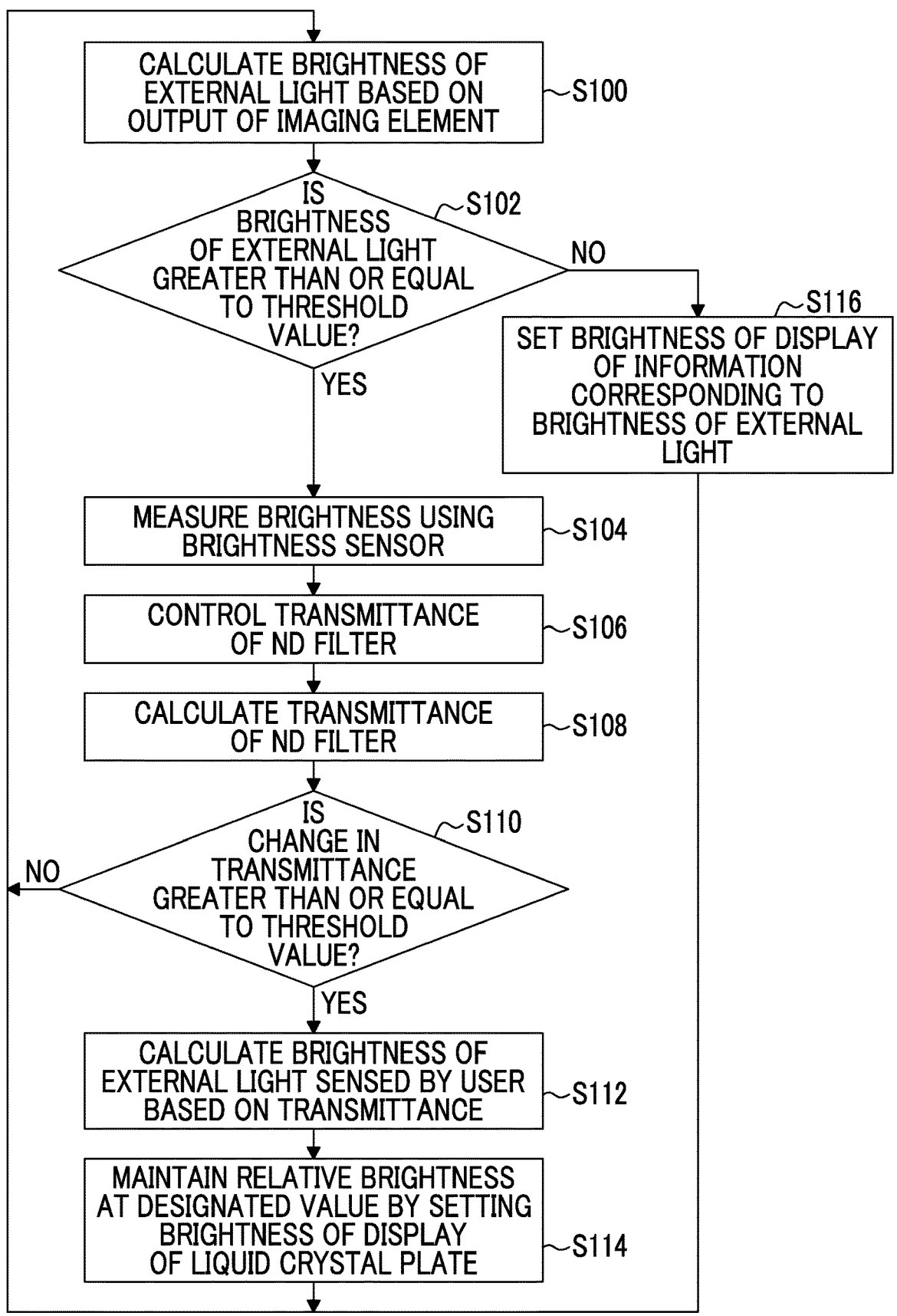
FIG. 7 is a flowchart illustrating a method of controlling a finder apparatus.

FIG. 7 is a flowchart illustrating the method of controlling the finder apparatus. The processing in FIG. 7 is performed in a state where the finder shutter 276 is retracted from the optical path and the optical view finder is ON (a state where the external light is transmitted through the finder window 241 and the ND filter 243 and guided to the finder eyepiece portion 242). In order to perform calculation and/or control of the transmittance and control of the relative brightness with high accuracy, it is preferable to perform control at a high rate (short time interval), for example, the same rate as a frame rate. However, control may be performed at a lower rate (for example, once for a plurality of frames) depending on the characteristics (a response speed and the like) of the ND filter 243. Any of the cases is included in "control in real time" according to the embodiment of the present invention.

In a case where control is started, the AE/AWB detection unit 229 (brightness information acquisition unit) calculates the brightness of the external light based on the output of the imaging element 202 (step S100: brightness information acquisition step). Specifically, the AE/AWB detection unit 229 (brightness information acquisition unit) performs integrating accumulation on the G signal output from the imaging element 202, and the main CPU 251 calculates the brightness of the external light (brightness of the subject light) based on the integrating accumulation value. This processing is performed for each region corresponding to the regions R1, R2, and R3 of the ND filter 243 in the imaging element 202. The display control unit 210 (brightness control unit) determines whether or not the calculated brightness of the external light is greater than or equal to a threshold value (step S102). In a case where the brightness of the external light is greater than or equal to the threshold value (YES in step S102), calculation of the transmittance and control of the relative brightness (steps S104 to S114) are performed.

In a case where the brightness of the external light is less than the threshold value (NO in step S102), the display brightness of the liquid crystal plate 248 is set to brightness corresponding to the brightness of the external light (brightness calculated based on the signal output by the imaging element 202) (step S116). In this case, the transmittance of the ND filter 243 is not used in setting the display brightness of the liquid crystal plate 248. It is considered that in a situation or a region in which the brightness of the external light is significantly low (less than the threshold value), the brightness of the information display is excessively increased, and there is a possibility that calculation and control of the transmittance are not appropriately performed.

In a case where the brightness of the external light is greater than or equal to the threshold value (YES in step S102), the brightness sensor control unit 262 (brightness measurement unit) measures the brightness of light incident on the brightness sensor 272 (step S104: brightness measurement step). Light in which the light emitted from the liquid crystal plate 248 (display device) and transmitted through the half mirror surface 246M (half mirror) and the light transmitted through the ND filter 243 (electronically variable ND filter) and reflected by the half mirror surface 246M (half mirror) are superimposed by the prism 246 (half mirror) is guided to the brightness sensor 272 (brightness measurement unit).

<Control of Transmittance>

The transmittance control unit 264 (transmittance control unit) independently controls the transmittance of the ND filter 243 for each region (regions R1, R2, and R3) based on the brightness of the external light (brightness information of the external light) (step S106: transmittance control step). Control of the transmittance may be performed by applying a voltage to the transparent electrodes. The transmittance control unit 264 may control the transmittance in accordance with an operation of the operation unit 220 or the like performed by the user.

<Calculation of Transmittance>

The transmittance control unit 264 (the transmittance calculation unit and the transmittance control unit) calculates the transmittance for the regions R1, R2, and R3 of the ND filter 243 in real time using a procedure described below (step S108: transmittance calculation step). In the first embodiment, the term "real time" includes not only a case where calculation of the transmittance is performed at the same rate as the frame rate but also a case where the rate is less than the frame rate.

In the finder 240 having the above configuration (refer to FIG. 4), it is assumed that a brightness measurement value (brightness of the light in which the external light and the information display are superimposed) of the brightness sensor 272 is denoted by Lmes, the brightness of the external light in the superimposed light is denoted by Lmes-out, and the brightness of the information display of the liquid crystal plate 248 in the superimposed light is denoted by Lmes-disp. In this case, relationships represented by Expressions (1) to (3) below are established among the brightness values.

$$L_{mes} = L_{mes\text{-}out} + L_{mes\text{-}disp} \quad (1)$$

$$L_{mes\text{-}out} = t_{ND} \times r_{prism} \times L_{out} \quad (2)$$

$$L_{mes\text{-}disp} = t_{prism} \times L_{disp} \quad (3)$$

In Expressions (1) to (3), the transmittance of the ND filter 243 is denoted by tND. The reflectance of the prism 246 is denoted by rprism. The transmittance of the prism 246 is denoted by tprism. The brightness of the external light calculated from the output of the imaging element 202 is denoted by Lout. The display brightness of the information by the liquid crystal plate 248 is denoted by Ldisp.

Among the above parameters, Lmes may be measured by the brightness sensor 272, and rprism and tprism may be measured in advance. In addition, Lout may be calculated from the output of the imaging element 202, and Ldisp may be recognized by the display control unit 210. Thus, by substituting the calculated or measured values in Expressions (1) to (3), the transmittance (tND) of the ND filter 243 may be calculated. Accordingly, in the first embodiment, information of brightness that is affected by the actual change in transmittance is acquired by the brightness sensor 272. Thus, the transmittance in which the effect of temperature characteristics, variations for each type of solid, and the like are excluded may be measured and controlled.

In a case where the transmittance of the ND filter 243 is calculated in step S108, the transmittance control unit 264 (the transmittance calculation unit and the transmittance control unit) determines whether or not a change in transmittance is greater than or equal to a threshold value for the regions R1, R2, and R3 (step S110). For example, the determination may be performed by comparing the transmittance calculated in the previous frame with the transmittance calculated in the current frame. In a case where the transmittance is calculated once for a plurality of frames, the previously calculated transmittance may be used. Alternatively, a determination as to whether or not a change in transmittance within a certain period is greater than or equal to the threshold value may be performed. The control for maintaining the relative brightness (steps S112 and S114) is performed for a region in which the change in transmittance is greater than or equal to the threshold value. In a case where the transmittance of the ND filter 243 is significantly changed, there is a possibility that the relative brightness between the information displayed on the liquid crystal plate 248 and the external light is significantly changed and hinders visual recognition of the information. Thus, by maintaining the relative brightness in a case where the transmittance is changed by greater than or equal to the threshold value, the user easily visually recognizes the information displayed on the liquid crystal plate 248.

In a case where the change in transmittance is greater than or equal to the threshold value, the transmittance control unit 264 (the transmittance calculation unit and the transmittance control unit) calculates the brightness of the external light sensed by the user in the finder eyepiece portion 242 based on the transmittance (step S112: relative brightness control step). The "brightness of the external light sensed by the user" may be calculated by multiplying the brightness of the external light (Lout) calculated from the imaging element 202 by the transmittance (tND) of the ND filter 243 and the transmittance (tprism) of the prism 246.

The transmittance control unit 264 (the transmittance calculation unit and the transmittance control unit) sets the display brightness of the liquid crystal plate 248 in real time for each region (refer to FIGS. 9 to 11) corresponding to the regions R1 to R3 of the ND filter 243 based on the brightness of the external light calculated in step S112. Accordingly, the relative brightness between the information in the liquid crystal plate 248 and the external light (external light sensed by the user) transmitted through the ND filter 243 and the half mirror surface 246M in the finder eyepiece portion 242 is maintained at a designated value (step S114: relative brightness control step). For example, the relative brightness may be defined as (brightness of the information in the finder eyepiece portion 242)/(brightness of the external light in the finder eyepiece portion 242). The brightness of the information in the finder eyepiece portion 242 may be calculated by multiplying the display brightness of the liquid crystal plate 248 by the reflectance (rprism) of the prism 246. In the first embodiment, by maintaining the relative brightness, information in the finder may be easily visually recognized. In addition, in the first embodiment, the relative brightness may be obtained as described above. Thus, in a case where the brightness of the information display is excessively high, burn-in may be prevented by decreasing an input value (brightness value) in only the information display of the part. The "designated value" may be set in accordance with an operation performed by the user (in this case, the user may set desired relative brightness) or may be set by the imaging apparatus 100 (display control unit 210) regardless of an instruction from the user.

<Example of Brightness Control>

FIG. 8 is a conceptual diagram illustrating a state of the control for maintaining the relative brightness in a case where the brightness of the external light is rapidly increased. Part (a) is a graph showing the brightness of the external light and illustrates a state where the brightness is rapidly increased (rapid brightening) at time t1. Part (b) is a graph showing the transmittance of the ND filter 243. The transmittance is decreased along with the increase in brightness of the external light. However, since the ND filter 243 uses the EC element as described above, it takes time to respond, and the transmittance is stabilized at time t2. In this case, in a case where the display brightness of the liquid crystal plate 248 shown in Part (c) is increased as illustrated by a dot dash line of d in accordance with the transmittance in a stabilized state (after time t2), the transmittance is high from time t1 to time t2, and the external light in the finder eyepiece portion 242 is bright. Thus, the display brightness of the liquid crystal plate 248 is relatively decreased, and the displayed information is not easily visually recognized. Meanwhile, in the first embodiment, the relative brightness is maintained by increasing (controlling in real time) the display brightness of the liquid crystal plate 248 as illustrated by a solid line in Part (c). Thus, the information displayed on the liquid crystal plate 248 is easily visually recognized.

<Example of Finder Display>

FIG. 9 is a diagram illustrating a state that is visually recognized in the finder eyepiece portion 242 in a state (state where the field of view is dark) before time t1 in FIG. 8. The liquid crystal plate 248 is divided into the regions F1 to F3 corresponding to the regions R1 to R3 of the ND filter 243, respectively, and the display brightness is controlled for each region. The regions F1 and F3 are regions in which the imaging information is mainly displayed. An exposure mode, the shutter speed, and sensitivity are displayed in the region F1 by the liquid crystal plate 248. A focus mode and the current focal length are displayed in the region F3 by the liquid crystal plate 248. The region F2 is a region in which the optical image (optical image of the subject light incident from the finder window 241) of the subject is mainly displayed. The frame (bright frame BF) showing the imaging range and a frame FF showing the AF area are displayed in the region F2 by the liquid crystal plate 248. While the optical image (not illustrated in FIGS. 9 to 11) of the subject is displayed in the regions F1 to F3, the imaging information is displayed in superimposition with the optical image in the regions F1 and F3, and the bright frame BF and the frame FF are displayed in superimposition with the optical image in the region F2 by the liquid crystal plate 248.

Figure 11:
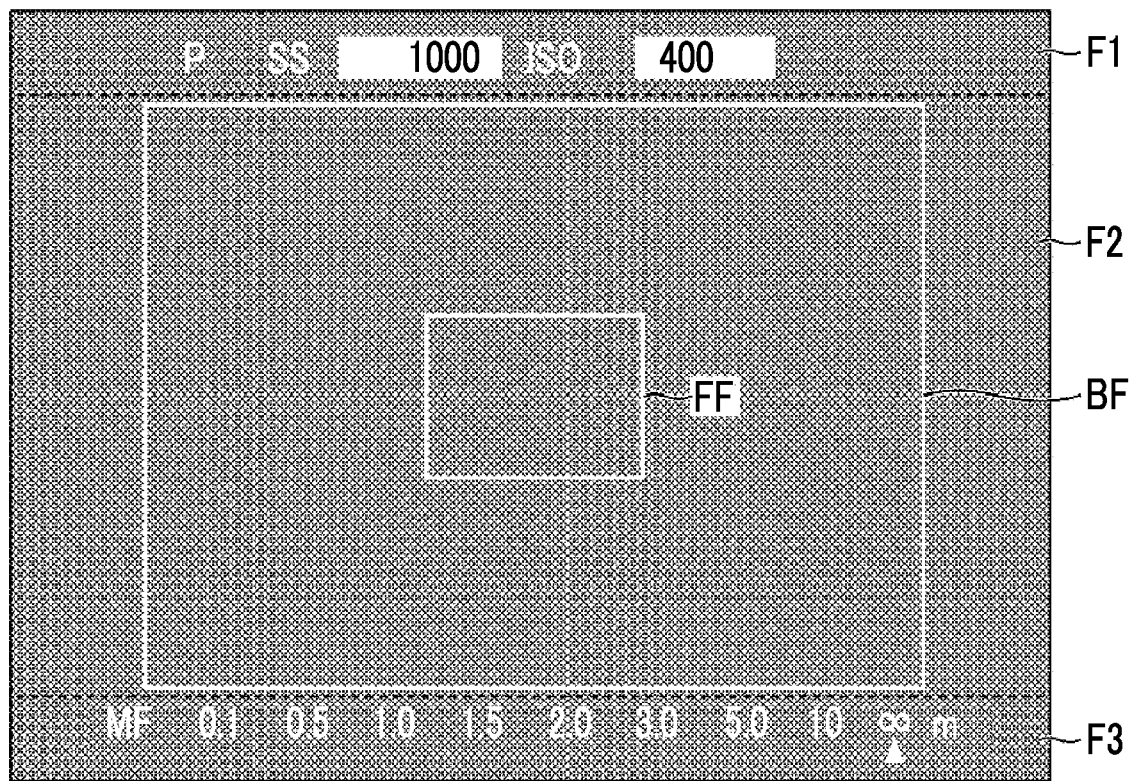
FIG. 11 is still another diagram illustrating the state of display of the finder.

FIG. 10 is a diagram illustrating a state (a case where the relative brightness is not controlled) that is visually recognized in the finder eyepiece portion 242 when the field of view is rapidly brightened at time t1 in FIG. 8. The imaging information and the frame FF displayed in the regions F1 to F3 are not in an easily visually recognized state. FIG. 11 is a diagram illustrating a state of a case where the relative brightness is controlled using the above procedure. The relative brightness is maintained by increasing the display brightness of the liquid crystal plate 248 as illustrated in FIG. 8. Thus, the information displayed in the regions F1 to F3 is easily visually recognized.

While a case where the brightness of the external light is rapidly increased has been described with FIGS. 8 to 11, the same may be applied to control in a case where the brightness of the external light is rapidly decreased. Specifically, even in a case where the brightness of the external light is decreased, the transmittance of the ND filter 243 is not immediately increased. Thus, while the transmittance is being increased, the relative brightness may be maintained by decreasing the display brightness of the information by the liquid crystal plate 248 below the display brightness after the transmittance is increased.

As described above, according to the first embodiment, the transmittance of the ND filter 243 may be measured in real time. In addition, the relative brightness between the information and the external light is maintained at the designated value based on the transmittance. Thus, the information in the finder is easily visually recognized.

<Calculation of Transmittance by Intermittently Stopping Display of Liquid Crystal Plate>

In the first embodiment, the transmittance of the ND filter 243 is calculated in a state where information is displayed on the liquid crystal plate 248. Alternatively, the transmittance may be calculated by intermittently stopping the display of the liquid crystal plate 248. In this case, light from the liquid crystal plate 248 is not incident on the brightness sensor 272, and only the external light (subject light) reflected by the half mirror surface 246M is incident on the brightness sensor 272. Thus, the transmittance of the ND filter 243 may be accurately calculated. Such intermittent stopping may be performed a plurality of times until the transmittance of the ND filter 243 is stabilized against a change in brightness of the external light (depending on the characteristics of the filter, for example, approximately one second). In a case where the number of times the intermittent stopping is performed is large, flickering of the display, a change in lightness, and the like stand out easily. Thus, the stopping of the display may be set not to easily stand out by maintaining average brightness by increasing the display brightness of the liquid crystal plate 248 before and after the intermittent stopping.

<Others>

Figure 12:
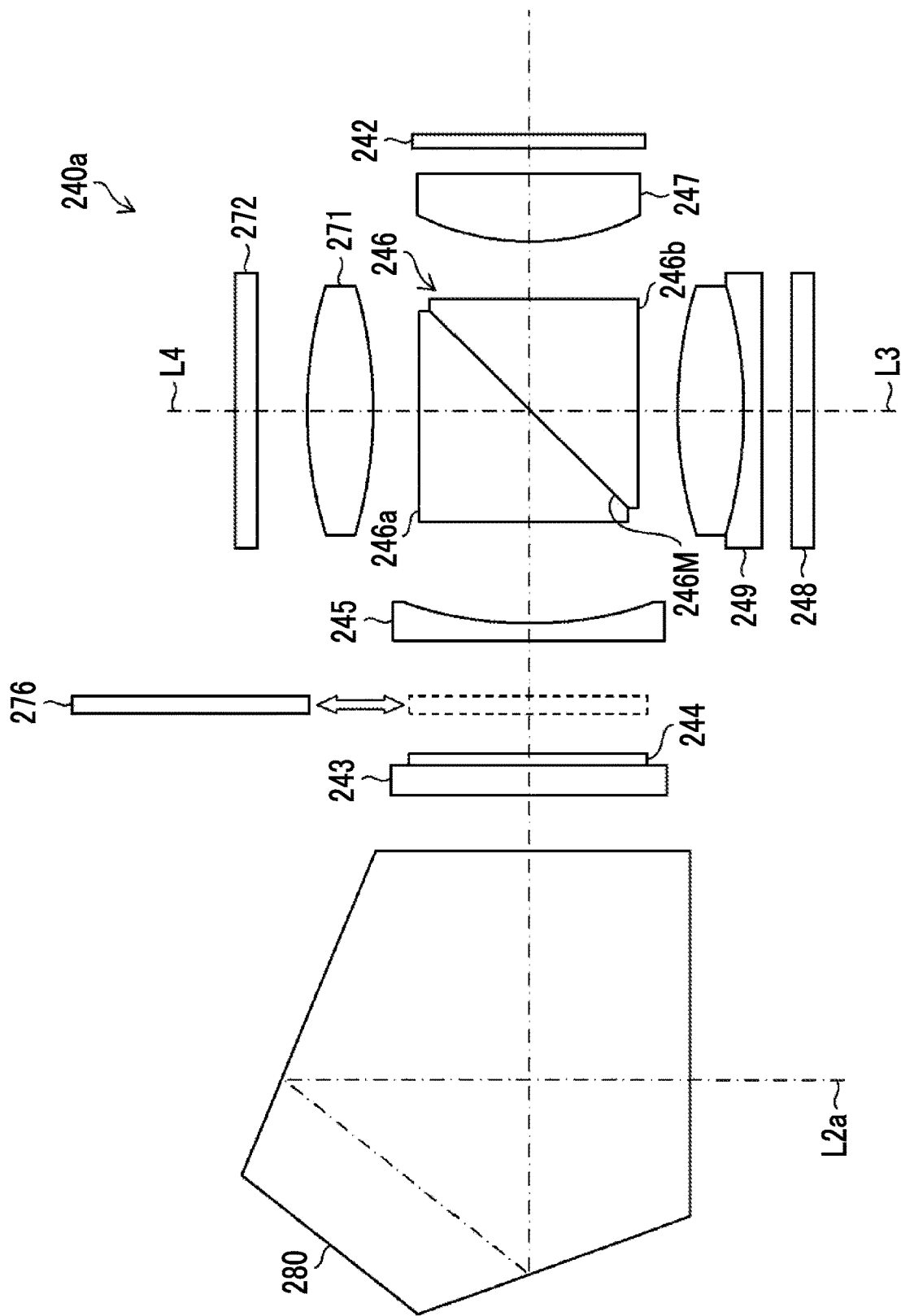
FIG. 12 is a diagram illustrating a configuration of the finder in a single-lens reflex type imaging apparatus.

While a case where the finder 240 is incorporated in the imaging apparatus 100 of a compact camera type has been described in the first embodiment, the finder apparatus, the imaging apparatus, and the method of controlling the finder apparatus according to the embodiment of the present invention can also be applied to a single-lens reflex type imaging apparatus. Specifically, in a finder 240a in the case of the single-lens reflex type imaging apparatus, for example, by arranging the optical system of the finder after a pentaprism 280 as illustrated in FIG. 12, the external light (optical axis L2a) is incident on the ND filter 243 through an imaging optical system and a mirror, not illustrated. In such an aspect, calculation and control of the transmittance may also be performed in the same manner as the first embodiment.

In addition, the finder apparatus according to the embodiment of the present invention is not limited to an aspect in which the finder apparatus is incorporated in the imaging apparatus, and may also be applied to an aspect in which the finder apparatus is externally attached to the imaging apparatus through an interface such as a hot shoe. In addition, in the finder apparatus according to the embodiment of the present invention, the electronically variable ND filter is not limited to the filter using the EC element and may be a filter using a transmissive type liquid crystal.

While the embodiment of the present invention has been described above, the present invention is not limited to the embodiment and may be subjected to various modifications without departing from the spirit of the present invention.

EXPLANATION OF REFERENCES

100: imaging apparatus
200: camera main body
201: imaging element control unit
202: imaging element
203: analog signal processing unit
204: A/D converter
205: image input controller
206: digital signal processing unit
208: compression/decompression processing unit
210: display control unit
211: release button
212: dial
213: monitor
214: switching lever
216: time tracking unit
220: operation unit
221: cross key
222: MENU/OK key
223: BACK key
224: Q button
226: flash ROM
227: AF detection unit
228, 344: ROM
229: AE/AWB detection unit
230: VRAM
232: SDRAM
234: media control unit
236: memory card
240, 240a: finder
241: finder window
242: finder eyepiece portion 243: ND filter
244: ¼ wave plate
245: objective lens
246: prism
247M: half mirror surface
246a: first prism
246b: second prism
247: eyepiece lens
248: liquid crystal plate
249: liquid crystal plate lens
250: mount communication unit
251: main CPU
252: battery
254: power supply control unit
256: mount
257: terminal
262: brightness sensor control unit
264: transmittance control unit
268: shutter control unit
271: brightness sensor lens
272: brightness sensor
276: finder shutter
280: pentaprism
300: interchangeable lens
310: zoom lens control unit
320: focus lens control unit
330: stop control unit
340: lens CPU
342: RAM
346: mount
347: terminal
350: mount communication unit
BF: bright frame
Cb, Cr: color difference signal
F1, F2, F3, R1, R2, R3, R4: region
FF: frame
FL: focus lens
I: stop
L1, L2, L2a, L3, L4: optical axis
S100 to S116: each step of method of controlling finder apparatus
Y: brightness signal
ZL: zoom lens

What is claimed is:

1. A finder apparatus comprising:
an optical finder for observing an optical image of a subject using an eyepiece portion;
a display device that displays information;
a half mirror that is arranged on an optical path of the optical finder;
an electronically variable neutral density filter that is inserted on a subject side from the half mirror on the optical path of the optical finder; and
a processor configured to
acquire brightness information of external light;
measure brightness of first light of superimposed external reflection light and display device transmission light by the half mirror, in which the external reflection light is the light, among the external light, which is reflected by the half mirror, and the display device transmission light is the light, among the light emitted from the display device and showing the information, which transmits through the half mirror; and
calculate transmittance of the electronically variable neutral density filter in real time based on the measured brightness of the first light and the acquired brightness information,
wherein the first light is guided to a brightness sensor by the half mirror and second light of superimposed external transmission light and display device reflection light by the half mirror is guided to the eyepiece portion, in which the external transmission light is the light, among the external light, which transmits through the electronically variable neutral density filter and the half mirror and the display device reflection light is the light, among the light emitted from the display device and showing the information, which is reflected by the half mirror.

2. The finder apparatus according to claim 1, wherein the processor calculates the transmittance based on the brightness measured in a period in which display of the information by the display device is stopped.

3. The finder apparatus according to claim 2, wherein the processor is further configured to maintain relative brightness between the information and the external transmission light in the eyepiece portion at a designated value by controlling display brightness of the information of the display device in real time depending on the calculated transmittance.

4. The finder apparatus according to claim 3, wherein the processor performs control for maintaining the relative brightness in a case where the transmittance is changed by greater than or equal to a threshold value.

5. The finder apparatus according to claim 4, wherein the processor performs control for maintaining the relative brightness in a case where the brightness of the external light is greater than or equal to a threshold value.

6. The finder apparatus according to claim 3, wherein the processor performs control for maintaining the relative brightness in a case where the brightness of the external light is greater than or equal to a threshold value.

7. The finder apparatus according to claim 2, wherein the optical finder guides the optical image of the subject based on the external light incident through a finder window to the eyepiece portion.

8. The finder apparatus according to claim 1, wherein the processor is further configured to maintain relative brightness between the information and the external transmission light in the eyepiece portion at a designated value by controlling display brightness of the information of the display device in real time depending on the calculated transmittance.

9. The finder apparatus according to claim 8, wherein the processor performs control for maintaining the relative brightness in a case where the transmittance is changed by greater than or equal to a threshold value.

10. The finder apparatus according to claim 9, wherein the processor performs control for maintaining the relative brightness in a case where the brightness of the external light is greater than or equal to a threshold value.

11. The finder apparatus according to claim 8, wherein the processor performs control for maintaining the relative brightness in a case where the brightness of the external light is greater than or equal to a threshold value.

12. The finder apparatus according to claim 1, wherein the optical finder guides the optical image of the subject based on the external light incident through a finder window to the eyepiece portion.

13. The finder apparatus according to claim 1,
wherein the optical finder guides the optical image of the subject based on the external light incident through an imaging optical system to the eyepiece portion.

14. The finder apparatus according to claim 1,
wherein the electronically variable neutral density filter is a neutral density filter using an electrochromic element.

15. An imaging apparatus comprising:
the finder apparatus according to claim 1;
an imaging element that outputs a signal indicating the optical image of the subject; and
the processor is further configured to control the transmittance of the electronically variable neutral density filter,
wherein the processor acquires the brightness information of the external light based on the signal output by the imaging element, and
controls the transmittance of the electronically variable neutral density filter based on the acquired brightness information of the external light.

16. The imaging apparatus according to claim 15,
wherein the electronically variable neutral density filter includes a plurality of regions, and the processor independently controls the transmittance for the plurality of regions.

17. A method of controlling a finder apparatus,
the finder apparatus including an optical finder for observing an optical image of a subject using an eyepiece portion, a display device that displays information, a half mirror that is arranged on an optical path of the optical finder, an electronically variable neutral density filter that is inserted on a subject side from the half mirror on the optical path of the optical finder, and a processor configured to acquire brightness information of external light, and measure brightness of first light of superimposed external reflection light and display device transmission light by the half mirror, in which the external reflection light is the light, among the external light, which is reflected by the half mirror and the display device transmission light is the light, among the light emitted from the display device and showing the information, which transmits through the half mirror, in which the first light is guided to a brightness sensor by the half mirror and second light of superimposed external transmission light and display device reflection light by the half mirror is guided to the eyepiece portion, in which the external transmission light is the light, among the external light, which transmits through the electronically variable neutral density filter and the half mirror and the display device reflection light is the light, among the light emitted from the display device and showing the information, which is reflected by the half mirror,
the method comprising:
a brightness measurement step of measuring brightness of the first light guided to the brightness sensor; and
a transmittance calculation step of calculating transmittance of the electronically variable neutral density filter in real time based on the measured brightness of the first light and the acquired brightness information.

18. The method of controlling the finder apparatus according to claim 17, further comprising:
a relative brightness control step of maintaining relative brightness between the information and the external transmission light at a designated value by controlling display brightness of the information of the display device in real time depending on the calculated transmittance.

19. The method of controlling the finder apparatus according to claim 17, further comprising:
a brightness information acquisition step of acquiring the brightness information of the external light based on a signal that is output from an imaging element and indicates the optical image of the subject; and
a transmittance control step of controlling the transmittance of the electronically variable neutral density filter based on the acquired brightness information.

* * * * *